United States Patent [19]
Alferness et al.

[11] Patent Number: 5,627,925
[45] Date of Patent: May 6, 1997

[54] NON-BLOCKING OPTICAL CROSS-CONNECT STRUCTURE FOR TELECOMMUNICATIONS NETWORK

[75] Inventors: Rodney C. Alferness; Adel A. M. Saleh, both of Holmdel, N.J.

[73] Assignee: Lucent Technologies Inc., Murray Hill, N.J.

[21] Appl. No.: 418,335

[22] Filed: Apr. 7, 1995

[51] Int. Cl.$^6$ ........................................ G02B 6/28
[52] U.S. Cl. .............................. 385/17; 385/16; 385/24; 359/124; 359/128
[58] Field of Search ............................... 385/17, 15, 16, 385/20, 24, 31, 46; 359/124, 115, 117, 128, 139

[56] References Cited

U.S. PATENT DOCUMENTS

5,194,977  3/1993  Nishio ........................................ 359/128

*Primary Examiner*—Phan T. H. Palmer

[57] ABSTRACT

Wavelength division multiplexing, spatial switching cross-connect structures which may be deployed as intermediate nodes of an all optical network to route any input channel on any source fiber to any destination fiber at any available wavelength to achieve full connectivity between the nodes of the network. The non-blocking cross-connect structure comprises a wavelength division demultiplexer for receiving multiple wavelength channels from each source fiber and for separating received channels into N wavelengths so that the wavelengths are organized according to a corresponding fiber of origin, a nonblocking optical structure for spatially and independently rearranging the received wavelengths so that wavelengths having a common destination fiber are grouped together, and a wavelength division multiplexer for multiplexing together wavelengths having the same destination fiber.

13 Claims, 8 Drawing Sheets

NON-BLOCKING OPTICAL CROSS-CONNECT STRUCTURE FOR TELECOMMUNICATIONS NETWORK

FIELD OF THE INVENTION

This invention relates to an optical fiber transmission network and more specifically to an optical cross-connect switch for use: in establishing high speed interconnections among the nodes of an all-optical network.

BACKGROUND OF THE INVENTION

Present day commercial lightwave transmission networks use optical fibers to carry large amounts of multiplexed information over long distances from a transmit terminal to a receive terminal. Most long-haul transmission lines and a substantial portion of short-haul transmission lines such as inter-office and intra-office links, local area networks (LANs), metropolitan area networks (MANs), and wide area network (WANs) are optical and, therefore, the information is carried over an optical fiber. A major advantage of transmitting information in optical form is the very large bandwidth and low losses associated with single mode optical fibers.

To reduce cost while still maintaining an acceptably low blocking characteristic, space-division switching networks are frequently designed to include a plurality of stages of switching nodes. The node stages are successively interconnected using a specified interconnection pattern. To achieve the overall switching function of connecting any network inlet to any network outlet, the individual switching nodes are typically selective in that they can connect any one of a plurality of node inputs to any one of a plurality of node outputs in response to control signals defining the desired connections. A necessary component for selectively interconnecting the nodes of a communication network in this manner, however, is a high capacity matrix or cross-connect switch.

Figure 1:
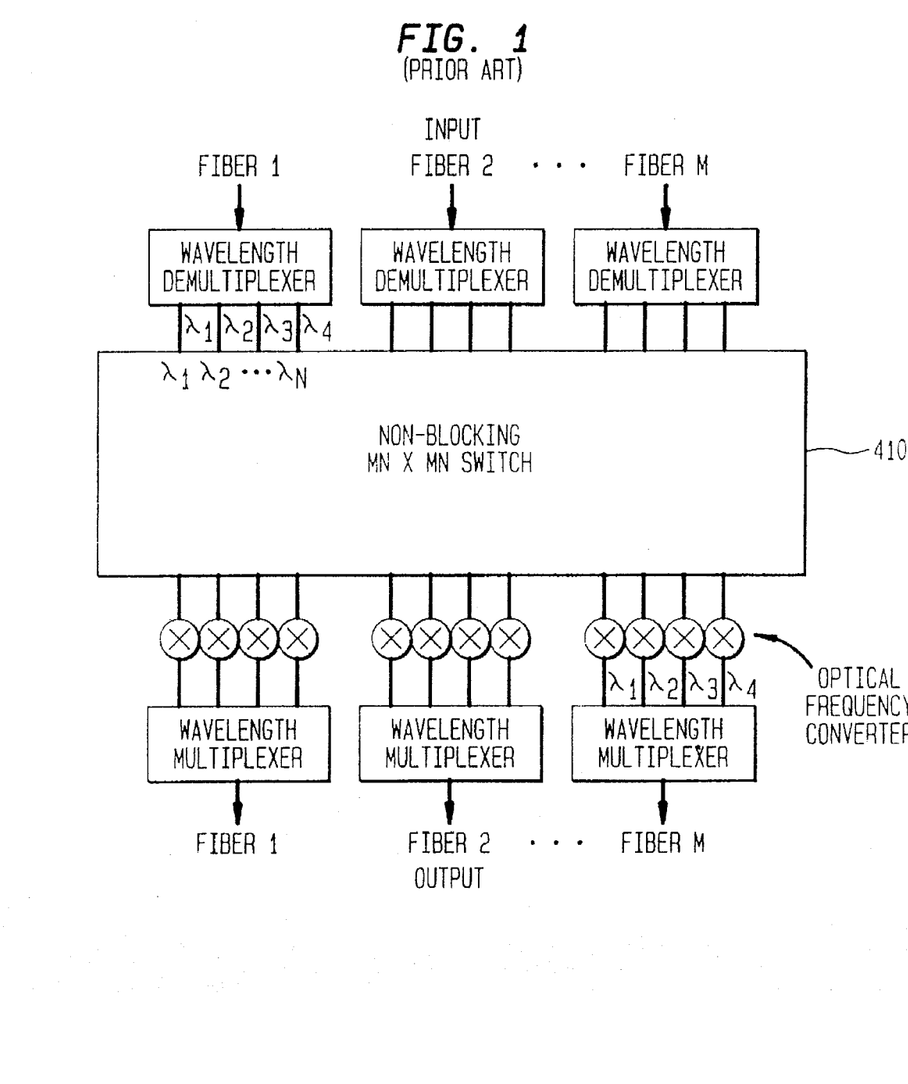
FIG. 1 is a block diagram depicting a previously proposed, all-optical MN×MN cross-connect structure employing demultiplexers, wavelength converters, and multiplexers.

In practice, at the transmitting end of an optical fiber, electrical signals representative of intelligence are transformed into optical signals for transmission along the optical fiber and, at the receiving end, are transformed back into electrical signals for further processing. Furthermore, in today's networks, the optical signals are converted to electrical signals, and back to optical, in order to use electronic switches to switch the various channels to their destinations, and/or to perform electronic regeneration in very long links. More recently, efforts have been made to develop an all optical, strictly non-blocking cross connect structure. In FIG. 1, for example, there is shown an example of a strictly non-blocking, all-optical MN×MN cross-connect structure 410 deployed as an intermediate node of an optical network.

As seen in FIG. 1, multiplexed optical signals are supplied from input optical fibers 1 through M. Each optical channel is separated to respective wavelengths $\lambda_1$ through $\lambda_N$ by a corresponding one of the wavelength demultiplexers. The demultiplexed wavelengths enter the MN×MN cross connect structure 410 and are directed, via an optical frequency converter and a wavelength demultiplexer, to appropriate output fibers 1 through M for transmission to a destination node. Although cross-connect structure 410 is non-blocking in that any idle inlet is always connectable to any idle outlet regardless of other array interconnections, the enormous size, design complexity, and large number of interconnections required for such a structure make it extremely expensive to fabricate and thus unsuitable for commercial applications.

It is, however, realized that with an all-optical network where optical signals can flow between users across the network without being converted to electronic signals within the network, the bandwidth available in optical fibers can be accessed in a more flexible and economic way. The benefits and advantages of being able to optically access the very broad bandwidth of optical fibers would permit a high-capacity, high speed network to be established for carrying data or information such as blueprints, words, music, medical and scientific images, movies, E-mail and the like from one location to another.

SUMMARY OF THE INVENTION

The present invention provides an all-optical network utilizing, as intermediate nodes, non-blocking optical cross connect structures interconnected by fiber links. Each cross connect structure is capable of spatially and independently exchanging optical channels or signals of different wavelengths with one or more network end-nodes and/or with additional cross-connect structures. As such, connections may be established in a non-blocking manner between any input channel on any input fiber coupled to the cross connect and any output channel available on any output fiber coupled to the cross-connect. The modular construction of the cross connect structures of the present invention are much less complex than a single MN×MN cross connect structure and are thus significantly less expensive to design and fabricate.

Each cross-connect is capable of receiving, from each of M multiplexed wavelength paths defined by a corresponding number of input fibers, an optical signal comprising up to N distinct channels or wavelengths. Each of the received wavelengths may be modulated with information to be transmitted through the cross-connect to an end-node, either directly or via one or more additional cross-connect nodes of the network. Since multiple wavelengths may be used on each input and output fiber coupled to the respective cross-connect structures, multiple simultaneous wavelength paths may be established between the end and intermediate nodes of the network to provide enhanced routing flexibility. Moreover, because the optical signals can flow between users across the network without being converted to electronic signals, the network has a very wideband width and data carried by the network is unimpeded by optical-to-electronic transformations.

In accordance with a presently preferred embodiment of the present invention, all of the wavelengths are spatially grouped according to fiber of origin after wavelength demultiplexing. The wavelengths are then rearranged in accordance with their respective destination nodes. Wavelengths to be transmitted to the same destination are multiplexed together and transmitted to the appropriate destination by way of an optical fiber link. In this way, high throughputs are established among the network nodes.

A non-blocking cross-connect structure constructed in accordance with the present invention comprises wavelength division demultiplexing means for receiving multiple wavelength channels from each source fiber and for separating received channels into N wavelengths so that the wavelengths are organized according to a corresponding fiber of origin, each individual wavelength from each source fiber being capable of carrying information destined for one specific destination fiber. The cross-connect structure further includes nonblocking optical means for rearranging the received wavelengths so that wavelengths having a common destination waveguide are grouped together, and wavelength division multiplexing means for multiplexing together grouped wavelengths having the same destination fiber.

In accordance with an illustrative embodiment of the present invention, the nonblocking optical means includes first spatial switching means having a plurality of inputs for receiving each demultiplexed wavelength from the wavelength division demultiplexing means and a plurality of outputs. The first spatial switching means is operative to supply any of the demultiplexed wavelengths to any of the outputs. The optical means further includes order preserving, wavelength changing means for receiving each demultiplexed wavelength from the outputs of the first spatial switching means and for changing or converting any received wavelength carrying information destined for a specific destination fiber to a wavelength currently available on the specific destination fiber, and second spatial switching means for receiving each converted wavelength from the wavelength changing means and for grouping the converted wavelengths according to destination fiber.

In a rearrangeably non-blocking cross-connect structure constructed in accordance with the present invention, each of the first and second spatial switching means includes N arrays of M×M optical switches. In a strictly non-blocking cross-connect structure, each of the first and second spatial switching means includes N arrays of M×2M or M×(2M−1) optical switches.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION OF THE PREFERRED EMBODIMENTS

Figure 2:
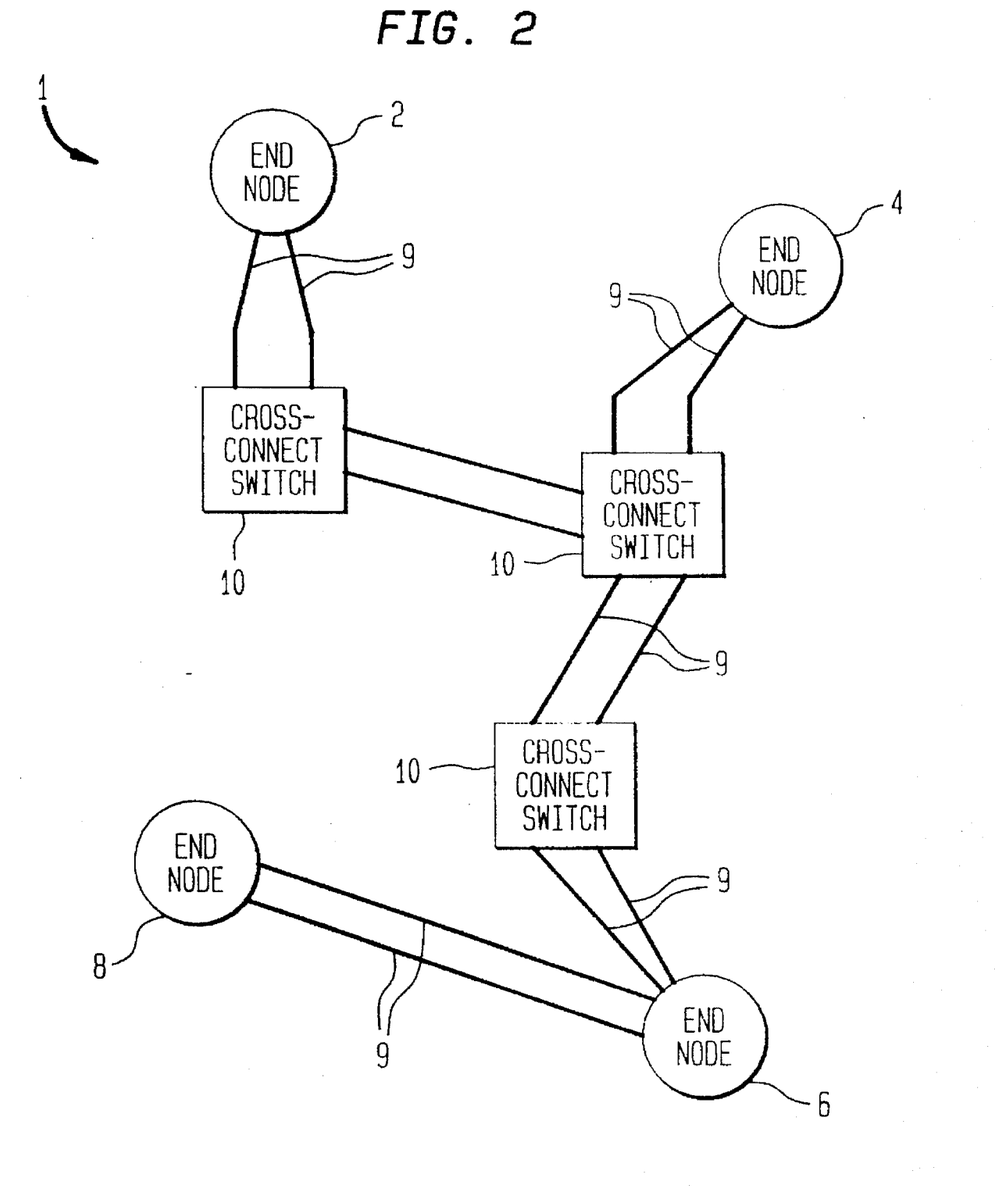
FIG. 2 is a block diagram of a flexible, all-optical network employing optical cross connects constructed in accordance with the present invention as intermediate nodes.

With initial reference to FIG. 2, there is shown an all-optical network 1 comprising a plurality of end nodes 2, 4, 6, and 8 interconnected by optical fiber trunks 9. Each end node of network 1 comprises, by way of illustrative example, a transmitting system and a receiving system (neither of which are shown). Each transmitting system includes a plurality of output ports for outputting a plurality of low bit rate channels in electronic form. The channels are grouped according to destination—that is, all of the channels to be transmitted to the same end node are grouped together. Each fiber trunk has a multiplicity of transmitted channels and includes a transmitting fiber and a receiving fiber. In each fiber, there are multiple wavelengths or channels. Up to N distinct wavelengths are produced by each transmitting system, with each respective wavelength carrying information destined for a corresponding receiving system. Thus, each individual wavelength from each source fiber is capable of carrying information destined for one specific destination fiber.

It will be noted that there is no full direct connectivity between all of the end nodes of the network. Essentially, full logical connectivity is provided by the establishment of an indirect light path, when necessary, by utilizing the intermediate nodes or cross connects 10. Suitable techniques for controlling the operation of cross-connect structures to obtain full connectivity between end-nodes are described in detail in U.S. Pat. No. 5,351,146 entitled ALL OPTICAL NETWORK ARCHITECTURE and assigned to the assignee of the present application, the disclosure of which application is incorporated herein by reference in its entirety.

In some instances, of course, it may be desirable to connect some end nodes directly to other end nodes via fiber/amplifier paths. Such connectivity is shown, for example, between end nodes 6 and 8. In any event, and with reference now to FIG. 3, there is illustrated a non-blocking cross-connect structure 10 constructed in accordance with an illustrative embodiment of the present invention and which may be used in an optical network such as the one depicted in FIG. 2. Up to N wavelengths or channels designated $\lambda_1$, $\lambda_2$, . . . $\lambda_N$ are carried in multiplexed form by each of a plurality of source waveguides,—illustratively, input optical fibers 1 to M.

Figure 3:
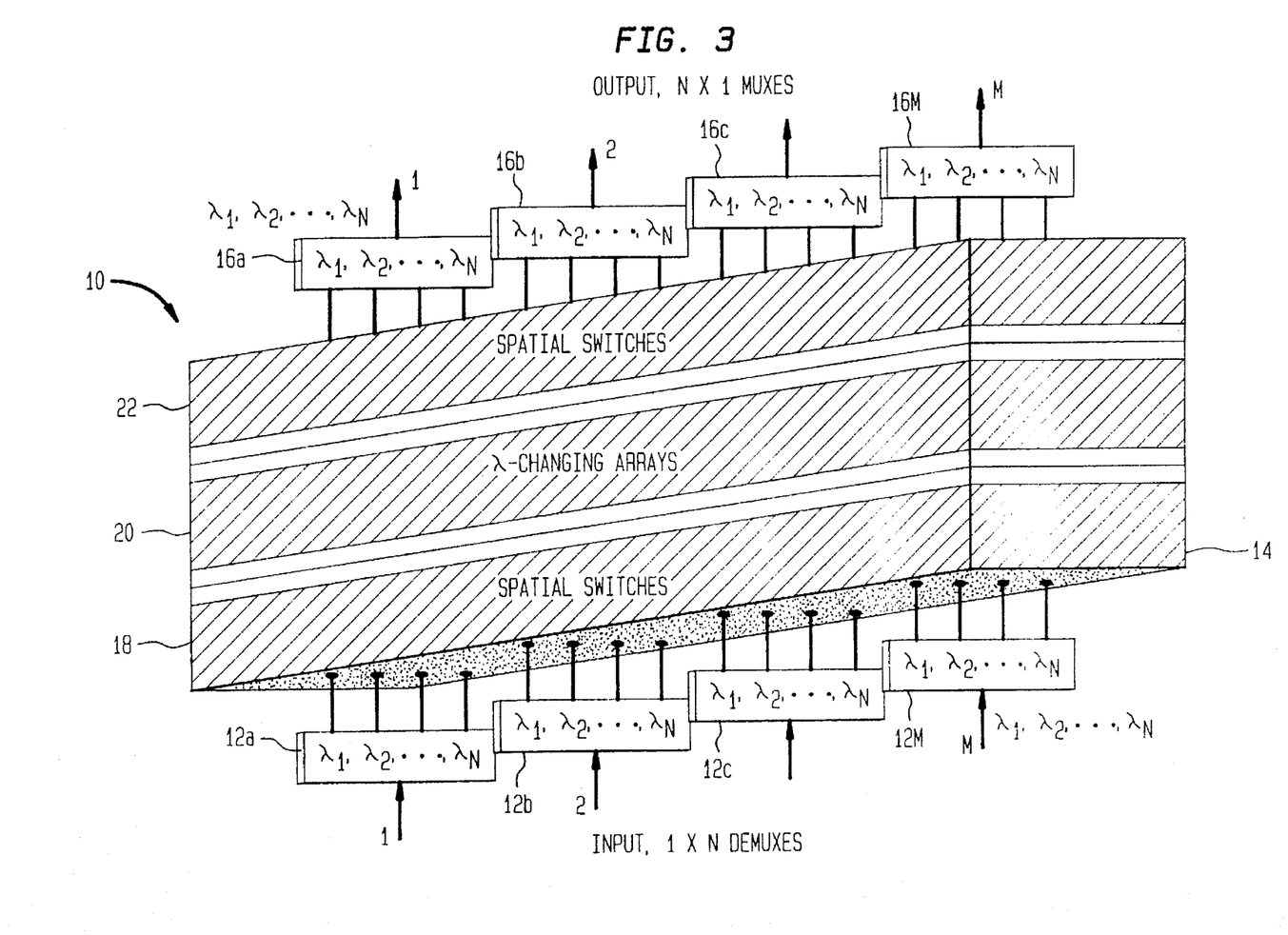
FIG. 3 is a block diagram depicting a non-blocking optical cross-connect structure constructed in accordance with the present invention.

With continued reference to FIG. 3. it will be seen that non-blocking cross-connect structure 10 includes wavelength division demultiplexing means, in the form of an array of 1×N wavelength division demultiplexers 12a to 12M, for receiving multiple wavelength radiation from each of the source fibers and for separating the received radiation into N wavelengths so that the wavelengths are organized according to a corresponding source or input fiber, non-blocking optical means 14 for rearranging the wavelengths so that wavelengths having a common destination or output fiber are grouped together, and wavelength division multiplexing means, in the form of an array of N×1 wavelength division multiplexers 16a to 16M, for multiplexing together wavelengths having the same destination fiber.

As will be described in detail later, nonblocking optical means 14 includes first spatial switching means 18 for receiving each demultiplexed wavelength from demultiplexers 12a to 12M, order preserving wavelength changing means 20 for receiving each demultiplexed wavelength from first spatial switching means 18 and for converting any received wavelength carrying information destined for a specific destination fiber to a wavelength currently available on that specific destination fiber, and second spatial switching means 22 for receiving each converted wavelength from the wavelength changing means and for grouping the converted wavelengths according to destination fiber.

Figure 4A:
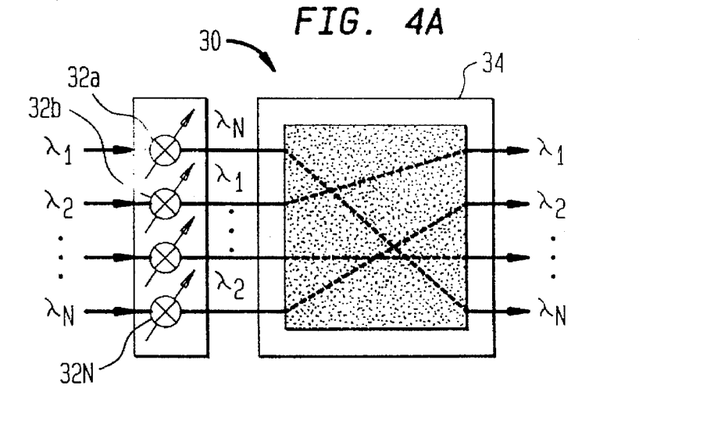
FIGS. 4A–4E are block diagrams depicting various order preserving, wavelength changing array configurations which may be utilized to construct a non-blocking optical cross-connect structure in accordance with the present invention.
Figure 4B:
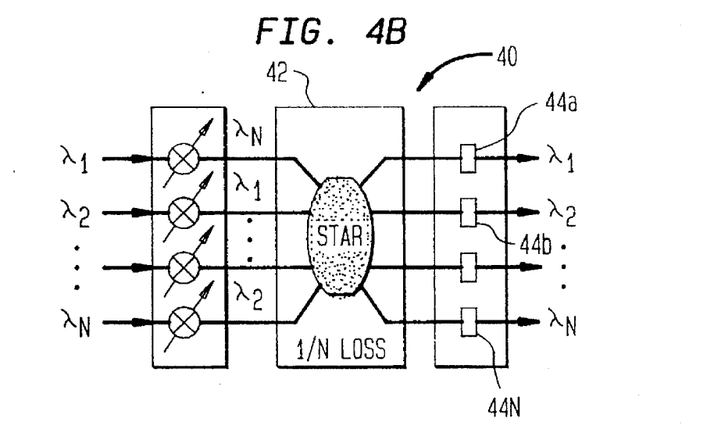
Figure 4C:
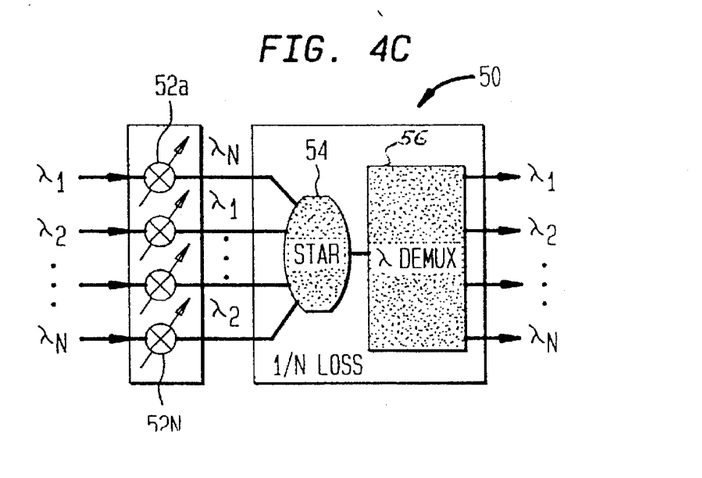

With reference now to FIGS. 4A–4E, there are shown various order preserving, wavelength changing array configurations which may be employed as wavelength changing means 20 for converting or transforming signals on wavelengths having an order $\lambda_1, \lambda_2 \ldots \lambda_N$ into a different order, for example, $\lambda_N, \lambda_1 \ldots \lambda_2$, in accordance with the present invention. In FIG. 4A, for example, there is shown a configuration of a wavelength changing array 30 which employs N variable-output wavelength changers 32a to 32N. Array 30 converts the respective input wavelengths in accordance with the availability of the wavelengths on corresponding destination fibers. A nonblocking N×N switch 34 reorders the converted wavelengths, thereby preserving the original order. The wavelength changing array 40 of FIG. 4B is similar to that of FIG. 4A except that the N×N switch is replaced by an N×N star coupler 42 and an array of fixed filters 44a to 44N. Another configuration of a wavelength changing array 50 is shown in FIG. 4C. Array 50 employs N variable-wavelength changers 52a to 52N, followed by an N×1 star combiner 54 and a fixed 1×N wavelength demultiplexer 56.

Figure 4D:
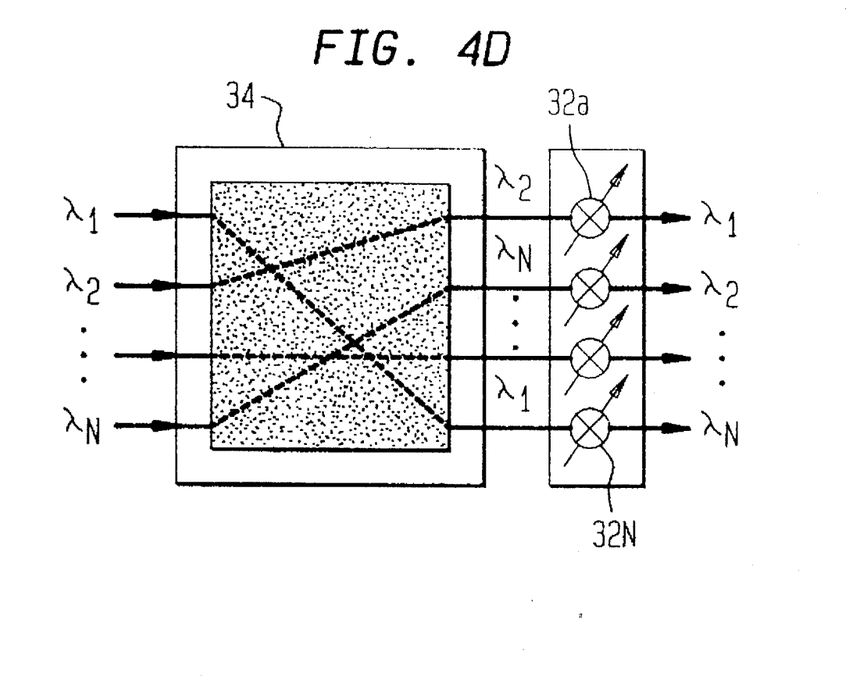
Figure 4E:
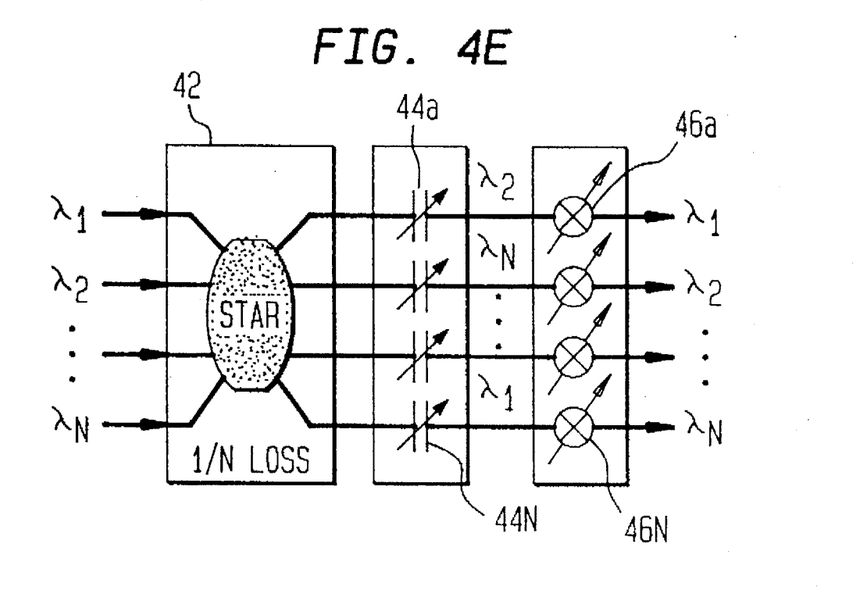

As seen in FIG. 4D, the configuration of FIG. 4A may be rearranged by placing the N×N switch 34 ahead of the wavelength changers 32a to 32N. This modified construction permits the use of fixed-output wavelength changers. Similarly, and as seen in FIG. 4E, the elements of FIG. 4B may be rearranged to obviate the need for variable-output wavelength chambers. Specifically, the outputs of N×N star coupler 42 are coupled to variable-output filters 44a to 44N, the outputs of which are, in turn, coupled to fixed-output wavelength changers 46a to 46N.

Figure 5:
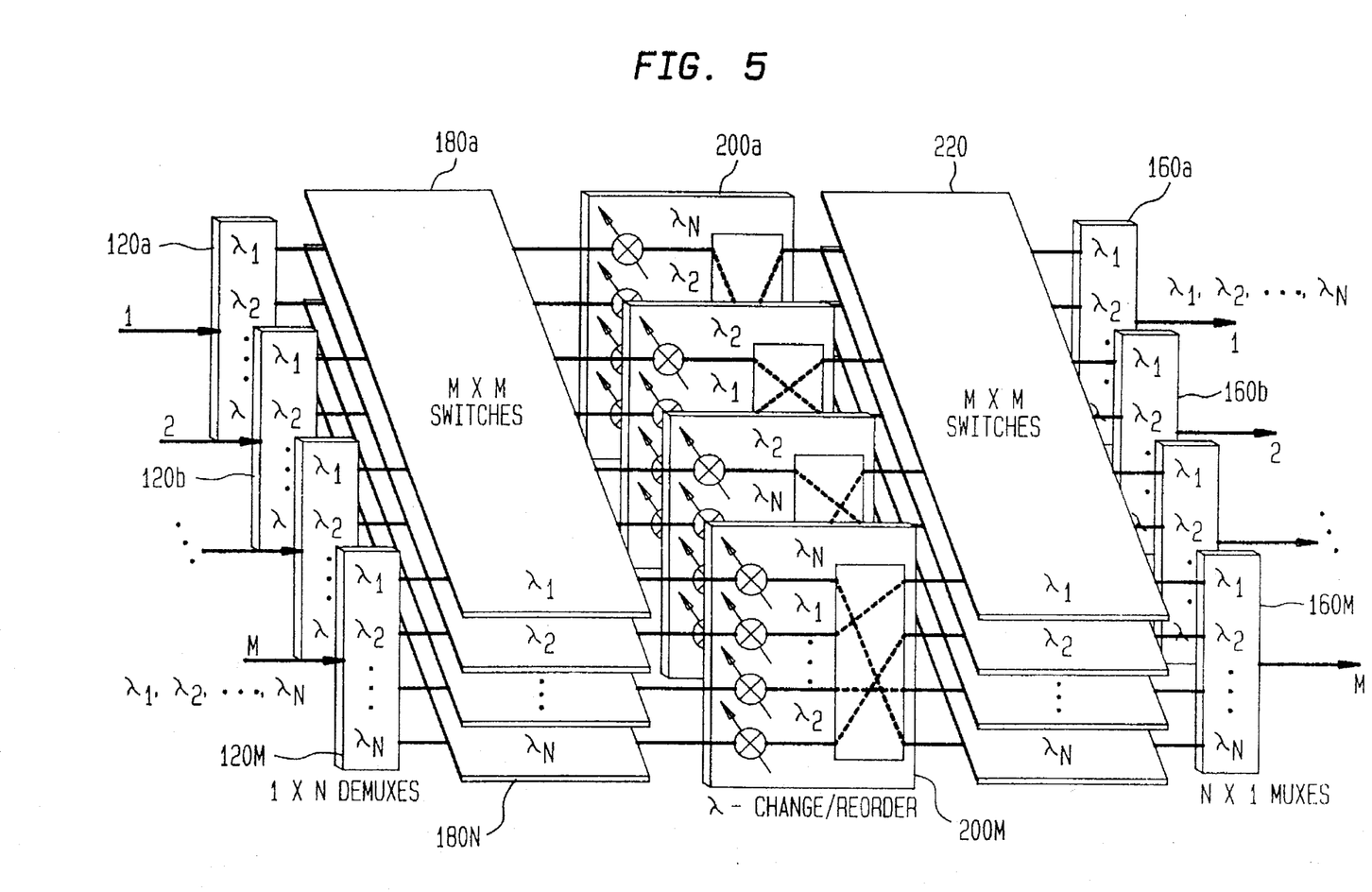
FIG. 5 is a detailed block diagram depicting a rearrangeably non-blocking optical cross-connect structure constructed in accordance with one embodiment of the present invention.

With reference now to FIG. 5, the construction of a rearrangeably non-blocking optical cross-connect structure 100 in accordance with an illustrative embodiment of the present invention will now be described. As will be recalled in connection with the description of FIG. 3 above, a nonblocking optical cross-connect structure in accordance with the invention includes optical means for rearranging the wavelengths so that wavelengths having a common destination fiber are grouped together. In the embodiment of FIG. 5, the optical means includes first spatial switching means in the form of N arrays of M×M spatial switches 180a to 180N, order-preserving wavelength changing arrays 200a to 200M, and second spatial switching means in the form of N arrays of M×M spatial switches 220a to 220N.

Spatial switches 180a to 180M each include a plurality of inputs for receiving each demultiplexed wavelength from the wavelength division demultiplexers and a plurality of outputs and are operative to supply any of the demultiplexed wavelengths to any of the outputs. By way of particular example, spatial switching arrays 180 to 180N may be implemented with conventional LiNbO₃ switching devices.

Although the order preserving, wavelength changing arrays 200a to 200N correspond to the configuration depicted in FIG. 4A, it will be readily appreciated that other order preserving, wavelength changing structures, such, for example, as those depicted in FIGS. 4B–4E, may also be employed. In any event, wavelength changing arrays 200a to 200M are configured to receive the demultiplexed wavelength from the outputs of the spatial switches and to convert any received wavelength carrying information destined for a specific destination fiber to a wavelength currently available on that destination fiber. Second spatial switches 220a to 220N then receive the converted wavelengths from the wavelength changing arrays and group the converted wavelengths according to destination fiber.

Figure 6:
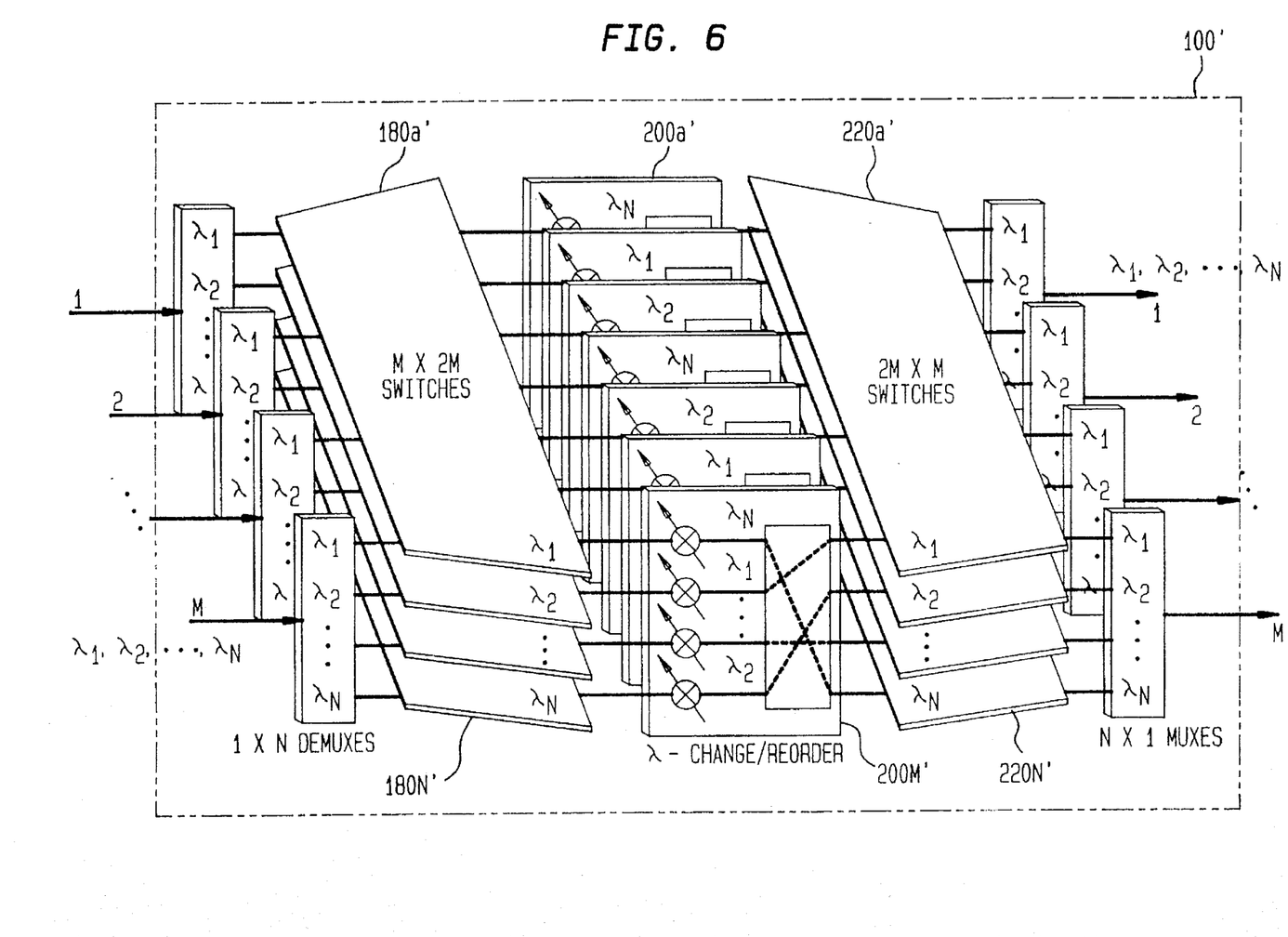
FIG. 6 is a detailed block diagram depicting a strictly non-blocking optical cross-connect structure constructed in accordance with another embodiment of the present invention.

A strictly non-blocking optical cross-connect 100' is shown in FIG. 6. In the embodiment depicted in FIG. 6, a modified optical means includes first spatial switching means in the form of N arrays of M×2M spatial switches 180a' to 180N', 2M order-preserving wavelength changing arrays 200a' to 200₂ₘ', and second spatial switching means in the form of N arrays of 2M×M spatial switches 220a' to 220N'. By changing the M×M spatial switch arrays of the rearrangeably non-blocking embodiment of FIG. 5 to M×2M switch arrays, and by doubling the number of array wavelength changers, a strictly non-blocking architecture is achieved. It should be noted that it is also possible to obtain a non-blocking structure by employing M×(2M−1) switches and 2M−1 wavelength changing arrays.

Figure 7A:
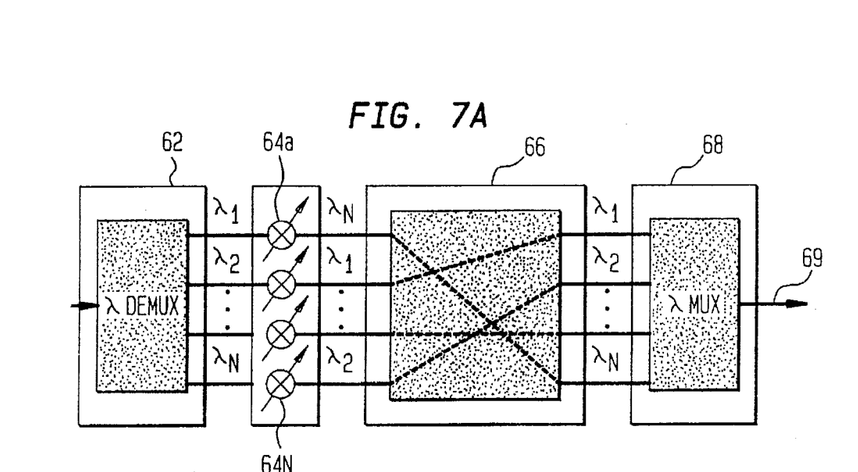
FIGS. 7A–7D are block diagrams depicting various single fiber, wavelength division switches utilizing order preserving, wavelength changing arrays in accordance with the present invention.
Figure 7B:
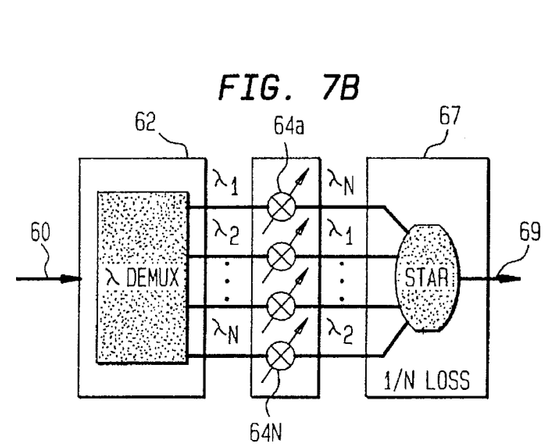

With reference now to FIGS. 5A–5D, various single fiber, wavelength division switch configurations are there shown in accordance with another aspect of the present invention. FIG. 7A utilizes the order preserving, wavelength changing array depicted in FIG. 4A. Thus, wavelengths $\lambda_1, \lambda_2 \ldots \lambda_N$ are supplied via source fiber 60 to a wavelength demultiplexer 62, converted into a second order of wavelengths, such as for example, $\lambda_N, \lambda_1 \ldots \lambda_2$, by variable wavelength changers 64a to 64N in accordance with available wavelengths on the destination fiber 69, and reordered by N×N switch 66. The resulting ordered set of wavelengths are multiplexed by wavelength multiplexer 68 and supplied to output fiber 69. A slightly modified embodiment of the arrangement of FIG. 7A is depicted in FIG. 7B. In this embodiment, the N×N switch 66 and wavelength multiplexer 68 are replaced with an N×1 star combiner 67. The output of the combiner 67 is supplied to fiber 69 as in the previous embodiment.

Figure 7C:
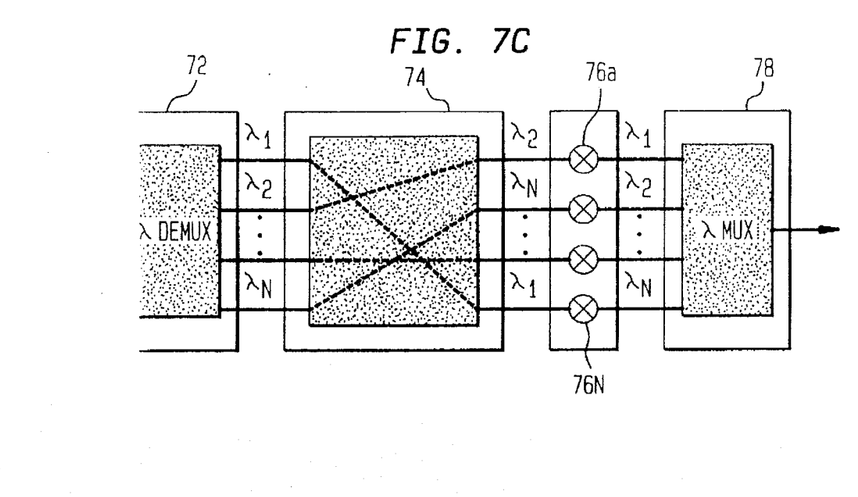

The single fiber, wavelength division switch configuration of FIG. 7C utilizes the order preserving, wavelength changing array depicted in FIG. 4D. Thus, wavelengths $\lambda_1, \lambda_2, \ldots \lambda_N$ are supplied via source fiber 70 to a wavelength demultiplexer 72 and reordered by N×N switch 74 as $\lambda_2, \lambda_N \ldots \lambda_1$. The wavelengths are then converted by variable wavelength changers 76a to 76N and the original order $\lambda_1, \lambda_2, \ldots \lambda_N$ is thereby reestablished. The resulting ordered set of wavelengths are multiplexed by wavelength multiplexer 78 and supplied to destination fiber 79.

Figure 7D:
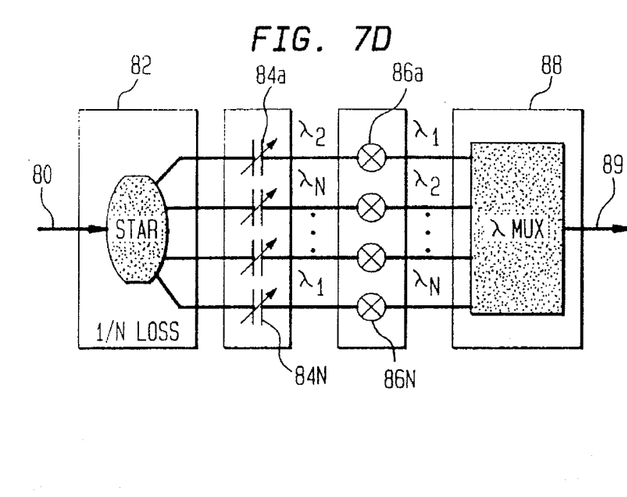

The single fiber, wavelength division switch configuration of FIG. 7D utilizes the order preserving, wavelength changing array depicted in FIG. 4E. Thus, wavelengths in the illustrative order $\lambda_1, \lambda_2, \ldots \lambda_N$ are supplied via source fiber 80 to a 1/N star splitter 82 and adjustable filters 84a to 84N are utilized to reorder the wavelengths. The original order is thereafter reestablished utilizing corresponding fixed-output wavelength changers 86a to 86N, the outputs of which are supplied to destination fiber 89 via waveguide multiplexer 88.

While there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the appended claims.

What is claimed is:

1. A nonblocking cross-connect structure for establishing connections between M source optical waveguides and M destination optical waveguides, comprising:

wavelength division demultiplexing means for receiving multiple wavelength, information carrying optical signals from each of said source waveguides and for separating said received optical signals into N wavelengths so that said wavelengths are organized according to a corresponding waveguide of origin, each individual wavelength from each source waveguide being capable of carrying information destined for a specific destination waveguide;

nonblocking optical means for rearranging said wavelengths so as to group together wavelengths having a common destination waveguide, said nonblocking optical means including first spatial switching means having a plurality of inputs for receiving said separated wavelengths from said wavelength division demultiplexing means and a plurality of outputs, said first spatial switching means being operable to supply any of said separated wavelengths to any of said outputs, order preserving, wavelength converting means for receiving each separated wavelength from the outputs of said first spatial switching means and for converting any said received wavelength carrying information destined for a specific destination waveguide to a wavelength currently available on said specific destination waveguide, and second spatial switching means for receiving each converted wavelength from said wavelength converting means and for grouping said converted wavelengths according to destination waveguide; and wavelength division multiplexing means for multiplexing together wavelengths having the same destination waveguide.

2. The structure according to claim 1, wherein each of said first spatial switching means includes N arrays of M×L optical switches and said second spatial switching means includes L×M optical switches, wherein L is at least M.

3. The structure according to claim 2, wherein L is at least 2M−1.

4. The structure according to claim 3, wherein said order preserving, wavelength converting means includes L wavelength converting and reordering arrays, each said wavelength converting and reordering array including N variable-output wavelength converters and a non-blocking N×N optical switch for reordering wavelengths converted by said wavelength converters.

5. The structure according to claim 3, wherein said order preserving, wavelength converting means includes L wavelength converting and reordering arrays, each said wavelength converting and reordering array including N wavelength converters, an N×N star coupler, and N fixed filters for receiving an output from said star coupler and outputting a respective predetermined wavelength.

6. The structure according to claim 3, wherein said order preserving, wavelength converting means includes L wavelength converting and reordering arrays, each said wavelength converting and reordering array including N wavelength converters, an N×1 star combiner, and a fixed 1×N demultiplexer.

7. The structure according to claim 3, wherein said order preserving, wavelength converting means includes L wavelength converting and reordering arrays, each said wavelength converting and reordering array including a non-blocking N×N optical switch and N fixed output wavelength converters having respective inputs coupled to corresponding outputs of said N×N optical switch.

8. The structure according to claim 3, wherein said order preserving, wavelength converting means includes L wavelength converting and reordering arrays, each said wavelength converting and reordering array including a star coupler, N tunable filters for outputting a respective selected wavelength, and N fixed output wavelength converters for receiving a corresponding selected wavelength from said filters and converting said corresponding wavelength to a predetermined wavelength.

9. The structure according to claim 2, wherein said order preserving, wavelength converting means includes M wavelength converting and reordering arrays, each said wavelength converting and reordering array including N variable-output wavelength converters and a non-blocking N×N optical switch for reordering wavelengths converted by said wavelength converters.

10. The structure according to claim 2, wherein said order preserving, wavelength converting means includes M wavelength converting and reordering arrays, each said wavelength converting and reordering array including N variable-output wavelength converters, an N×N star coupler, and N fixed filters.

11. The structure according to claim 2, wherein said order preserving, wavelength converting means includes M wavelength converting and reordering arrays, each said wavelength converting and reordering array including N variable-output wavelength converters, an N×1 star combiner, and a fixed 1×N demultiplexer.

12. The structure according to claim 2, wherein said order preserving, wavelength converting means includes M wavelength converting and reordering arrays, each said wavelength converting and reordering array including a non-blocking N×N optical switch and N fixed-output wavelength converters having respective inputs coupled to corresponding outputs of said N×N optical switch.

13. The structure according to claim 2, wherein said order preserving, wavelength converting means includes M wavelength converting and reordering arrays, each said wavelength converting and reordering array including a star coupler, N tunable filters for outputting a respective selected wavelength, and N fixed-output wavelength converters for receiving a corresponding selected wavelength from said filters and converting said corresponding wavelength to a predetermined wavelength.

* * * * *